Nov. 24, 1959 T. A. O. GROSS ET AL 2,914,762
DUAL CHANNEL NOISE COHERENCE REDUCERS
Filed Feb. 24, 1954

INVENTORS
THOMAS A. O. GROSS
JOHN A. SHEEHAN
BY
ATTORNEY

United States Patent Office 2,914,762
Patented Nov. 24, 1959

2,914,762

DUAL CHANNEL NOISE COHERENCE REDUCERS

Thomas A. O. Gross, South Lincoln, and John A. Sheehan, Jamaica Plain, Mass., assignors to Raytheon Company, a corporation of Delaware Application February 24, 1954, Serial No. 412,152

5 Claims. (Cl. 343—5)

This invention relates to means for greatly reducing the coherence of noise in two or more signal channels arising from a source common to all of said channels, and more particularly relates to means for reducing the auto-correlation or coherence of transmitter and local oscillator noise in the two-signal channels of a simultaneous lobing system.

Dual channel systems are known which comprise means for directly comparing the outputs of both channels in order to derive a voltage for control or indicating purposes which is proportional to the auto-correlation and cross-correlation of the outputs of the two channels. Noise or spurious signals generated by a source or sources of energy common to both channels has been found to produce troublesome output from the comparators forming part of the said simultaneous lobing systems because of the correlation or coherence of the noise present in the outputs of the two channels.

In accordance with this invention, the auto-correlation of noise, or the noise coherence, in the two-channel system is greatly reduced by introducing into one or both of said channels an electrical time delay network. By displacing in time the noise signals in the outputs of the two channels the noise coherence or correlation may be reduced to ten percent or less of the original value.

In order to facilitate comprehension of the invention it will first be described specifically with reference to a simultaneous lobing radar system. The principles of this invention, however, are equally applicable to various multiple channel systems, generally similar in their function and operation to the simultaneous lobing system specifically set forth.

Figure 1:
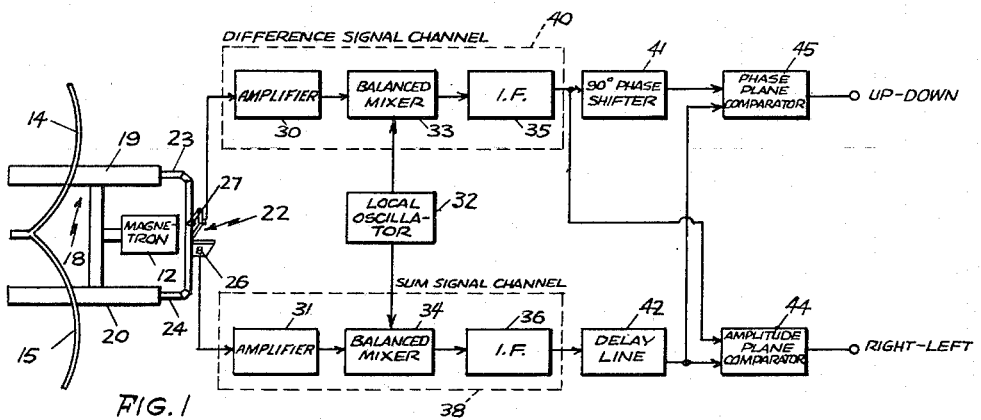
Fig. 1 is a block diagram of a simultaneous lobing radar system in accordance with the invention.

In Fig. 1, the simultaneous lobing system is provided with a source of energy 12, such as a magnetron, which is fed simultaneously to two identical narrow-beam paraboloidal antennas 14 and 15 mounted one above the other in a vertical plane and canted symmetrically in the horizontal plane so that they are directed at slight difference points in azimuth. This results in a symmetrical divergence of the antenna radiation patterns about the vertical plane of symmetry. A portion of the energy from source 12 radiated by antennas 14 and 15 is reflected from a target whose orientation is to be measured. This reflected energy is received by said antennas and separately mixed in two similar sections of square wave guides 19 and 20 of a duplexer 18 with a small portion of the energy from source 12. One form of duplexer which does not form a part of the subject invention, includes two square wave guides 19 and 20 capable of propagating horizontally and vertically polarized energy when excited by source 12. The vertically polarized components of the received signals are independently conveyed to opposite ends of a standard magic tee 22 by way of rectangular wave guide portions 23 and 24. The series and shunt arms of the magic tee 22 each contain a crystal detector.

When the target lies in the horizontal plane it is equidistant from both antennas and the signals received by the two antennas are in phase. One of the crystal detectors 26 receives the signals from the two antennas in phase and detects the sum of the two signals. It is possible to determine upon which side of the vertical plane of symmetry the target lies by observing the relative amplitudes of the in-phase signals received by the antennas. When the target lies in the vertical plane the target is no longer equidistant from both antennas; echoes received by the antennas from a target in the vertical plane have equal amplitudes but have a phase difference depending upon the relative distances from the target to the antennas. The other crystal detector 27 receives the two signals in phase opposition and detects the difference between the two received signals.

The sum and difference signals are separately fed to video amplifiers 30 and 31 of a sum signal channel 38 and a difference signal channel 40, all respectively. The amplified sum and difference signals are next fed to respective balanced mixers 33 and 34 where they are beat against the output of a conventional local oscillator 32 to provide intermediate frequency signals which are amplified in I.F. amplifiers 35 and 36.

The output of the difference signal channel 40 is applied directly to amplitude plane comparator 44 and to phase plane comparator 45 after undergoing a phase shift of 90 electrical degrees in phase shifter 41. The output of the sum signal channel 38 is applied to both comparators 44 and 45 through a delay line 42, to be referred to subsequently. The comparators essentially are balanced modulators having push-pull input to which the sum channel signal is applied and a single-ended input to which the difference channel signal is applied. The output of amplitude plane comparator 44 will be a direct current voltage proportional to the degree of unbalance in the comparator. The amplitude of the D.C. output of comparator 44 will be proportional to the right-left coordinates of the target. The phase plane comparator 45 is identical in construction to comparator 44 but the output of the difference signal channel is shifted ninety degrees in phase before application to the single-ended input of comparator 45. The output of the phase plane comparator is proportional to the up-down coordinates of the target.

In order to insure correct directional information, it is important that each of the two channels be identical, so that relative amplitude and phase of the two received signals will be preserved. Because of the identity of the two channels, noise or spurious signals generated by the magnetron 12 or by the local oscillator 32, if one is used, will be identical in both channels; that is, the noise present at the output of the sum channel will be coherent with that present at the output of the difference channel. In other words, the correlation of the noise voltages in both the channels is one hundred percent. When these noise voltages are applied to the amplitude plane (in-phase) comparator 44 the output of this comparator normally produced by the true signals will be adversely affected. The effect of large correlation of noise voltages is not particularly troublesome as applied to the phase plane comparator 45 because of the phase shift of the noise encountered in the difference signal channel prior to application to the phase comparator.

To obviate the disadvantages accruing from high correlation of noise, an electrical delay network 42, which may be any one of several types of delay lines well known in the art, such as a magnetostrictive delay line, is inserted in either channel and at any stage after the source of noise. As shown in Fig. 1, delay line 42 is inserted in the output of the sum signal channel, that is, between the I.F. amplifier 36 and amplitude plane comparator 44.

The correlation function $\rho$ for a given spectrum may be given by $$\rho = \cos 2\pi f_0 \tau \epsilon - \frac{\pi \tau f_0}{2}$$

where $f_0$ is the center frequency of the pass band of each channel and $\tau$ is the relative time delay between two channels.

The delays required to reduce correlation to ten percent of its original value is 0.75 microsecond for a one megacycle band width and 0.75 millisecond for a channel band width of one kilocycle. The latter figure is representative of a typical C.W. radar system.

The delay used must produce $2\pi n$ radians of phase shift where $n$ is any integer, in order that the elevation-azimuth sense of the simultaneous lobing system is not destroyed.

Figure 2:
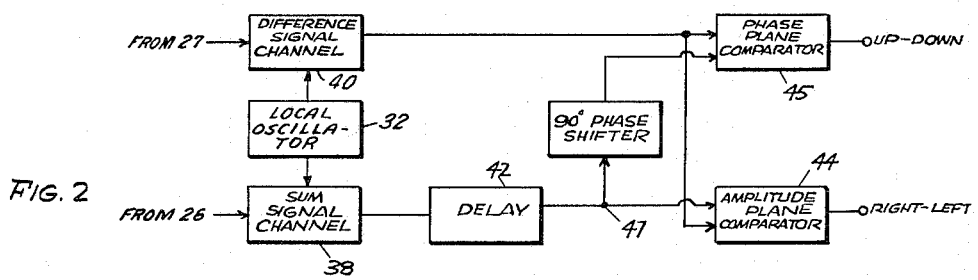
Figs. 2 and 3 are block diagrams of modifications of the system of Fig. 1.

In Fig. 2, a modification of the simultaneous lobing system of Fig. 1 is shown in which the output of the sum signal channel 38 is shifted ninety degrees in phase before application to the phase plane comparator 45, instead of shifting the phase of the output of the difference signal channel as in the system of Fig. 1. The systems of Figs. 1 and 2 are equally satisfactory, since in either system the inputs to the phase plane comparator are ninety degrees out of phase. It will be noted that the delay line 42 in Fig. 2 is connected in the sum signal channel, as in the system of Fig. 1; however, it may be placed in the difference signal channel if desired. Since, for reasons already pointed out, noise correlation in the two channels has no appreciable adverse effect upon the phase plane comparator, delay line 42 may be inserted to the right of circuit junction point 47, rather than in the position shown in Fig. 2.

Figure 3:
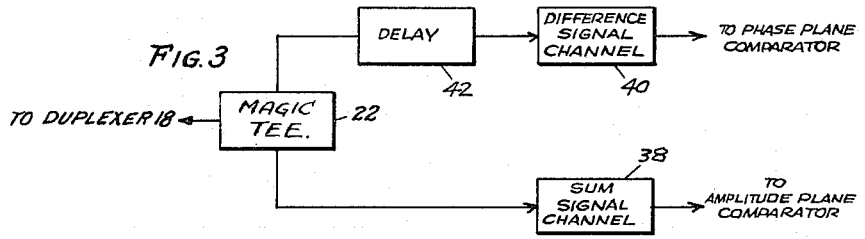

In Fig. 3, the delay line 42 is shown inserted in the difference signal channel instead of in the sum signal channel, as in the systems of Figs. 1 and 2. Furthermore, delay line 42 is inserted in the input of the difference signal channel rather than in the output. This latter arrangement is satisfactory provided the local oscillator is not productive of noise or provided that the local oscillator is omitted from the system.

Figure 4:
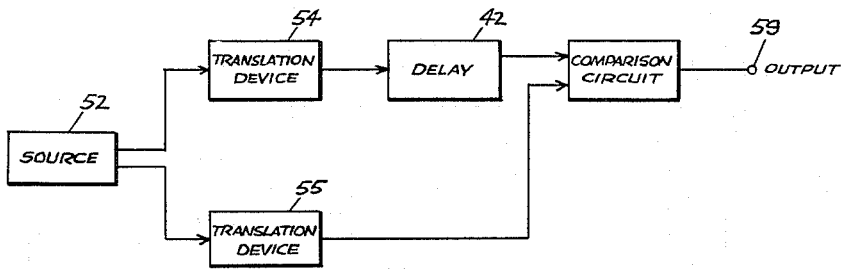
Fig. 4 is a block diagram of a second system utilizing the principles of the invention.

Although the invention has been described heretofore in connection with a simultaneous lobing system, the invention may be applied to any system energized by a common source and comprising two or more identical channels. These outputs are compared in a comparison circuit. Such a system is broadly shown in Fig. 4 and includes an energy source 52 which generates noise in addition to useful signals. The output from source 52 is applied to a dual channel system, each channel of which includes corresponding translation devices 54 and 55.

These translation devices may be any electrical circuit, such as an amplifier, which is capable of modifying the signal applied to its input terminals and whose transmission characteristics are substantially identical to that of the other translation devices. The outputs of translation devices 54 and 55 are combined in a comparison circuit 57 which may, for example, be a circuit such as the in-phase or amplitude plane comparator 44 of Figs. 1, 2, 3, for providing at the output terminal 59 a signal equal to the difference in amplitude of the two applied signals.

Because of the identity of the translation devices 54 and 55, any noise transmitted through one device will be coherent with that transmitted through the other device. In order to reduce the noise correlation or coherence, the delay network 42, similar to that already described, is inserted in one only of the two channels, as clearly shown in Fig. 4. This delay network 42, although shown in Fig. 4 in the output of translation device 54, may instead be placed in the output of translation device 55 with equally good results.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In combination, a source of electromagnetic energy, means for radiating such energy toward an object, means for receiving reflected energy from said object in the form of first and second echoes representative of spatial coordinates of said object, first means for deriving a first signal representative of the vector sum of said first and second echoes, second means for deriving a second signal representative of the vector difference between said first and second echoes, a first signal channel for transmitting said first signal, a second signal channel for transmitting said second signal, said first and second signal channels transmitting therethrough noise, said noise in the output of said first signal channel being coherent with that in the output of said second signal channel, means for shifting the phase of one of said signals ninety electrical degrees, first comparison means responsive to said first and second signals for producing a first direct current output voltage proportional to one of said spatial coordinates, second comparison means responsive to said phase-shifted one signal and to the other of said signals for producing a second direct current output voltage proportional to the other of said spatial coordinates, and signal delay means interposed in one only of said signal channels for altering the correlation of said noise in the outputs of said signal channels.

2. In combination, a source of electromagnetic energy, means for radiating such energy toward an object, means for receiving reflected energy from said object in the form of first and second echoes representative of spatial coordinates of said object, first means for deriving a first signal representative of the vector sum of said first and second echoes, second means for deriving a second signal representative of the vector difference between said first and second echoes, a first signal channel for transmitting said first signal, a second signal channel for transmitting said second signal, said first and second signal channels transmitting therethrough noise of substantially identical character, means for shifting the phase of one of said signals ninety electrical degrees, first comparison means responsive to said first and second signals for producing a first direct current output voltage proportional to one of said spatial coordinates, second comparison means responsive to said phase-shifted one signal and to the other of said signals for producing a second direct current output voltage proportional to the other of said spatial coordinates, and signal delay means interposed between one only of said signal channels and one of said comparison means for altering the correlation of said noise in the outputs of said signal channels.

3. In combination, a source of electromagnetic energy, means for radiating such energy toward an object, means for receiving reflected energy from said object in the form of first and second echoes representative of spatial coordinates of said object, first means for deriving a first signal representative of the vector sum of said first and second echoes, second means for deriving a second signal representative of the vector difference between said first and second echoes, a first signal channel for transmitting said first signal, a second signal channel for transmitting said second signal, said first and second signal channels transmitting therethrough noise of substantially identical character, means for shifting the phase of one of said signals ninety electrical degrees, first comparison means responsive to said first and second signals for producing a first direct current output voltage proportional to one of said spatial coordinates, second comparison means responsive to said phase shifted one signal and to the other of said signals for producing a second direct current output voltage proportional to the other of said spatial coordinates, and signal delay means interposed in one only of said signal channels for altering the correlation of said noise in the outputs of said signal channels, said correlation being given by the equation $$\rho = \cos 2\pi f_0 \tau \epsilon = \frac{\pi \tau f_0}{2}$$

where $\rho$ is the correlation of noise in said channels
$f_0$ is the center frequency of the pass band of said channels
$\tau$ (tan) is the relative time delay between the two channels
$\epsilon$ is the Napierian base approximately equal to 2.718
$\pi$ is a number approximately equal to 3.142

4. In combination, a receiver comprising a pair of receiving antennas having spaced radiation patterns, said receiver including first means for adding the signals received by said antennas to produce a first output, said receiver further including second means for subtracting one of said signals from the other to produce a second output, a first signal channel for transmitting said first output, a second signal channel for transmitting said second output said first and second signal channels transmitting therethrough noise of substantially identical character, means for shifting the phase of one of said outputs, first comparison means responsive to said first and second outputs for producing a first voltage, second comparison means responsive to the output of said phase-shifting means and to the other of said outputs for producing a second voltage, and signal delay means inserted in series with one only of said signal channels for altering the correlation of said noise in said channels.

5. In combination, a source of electromagnetic energy, means for radiating such energy toward an object, means for receiving reflected energy from said object in the form of first and second echoes representative of spatial coordinates of said object, first means for deriving a first signal representative of the vector sum of said first and second echoes, second means for deriving a second signal representative of the vector difference between said first and second echoes, a first signal channel for transmitting said first signal, a second signal channel for transmitting said second signal, said first and second signal channels transmitting therethrough noise, said noise in the output of said first signal channel being coherent with that in the output of said second signal channel, means for shifting the phase of one of said signals ninety electrical degrees, first comparison means responsive to said first and second signals for producing a first direct current output voltage proportional to one of said spatial coordinates, second comparison means responsive to said phase-shifted one signal and to the other of said signals for producing a second direct current output voltage proportional to the other of said spatial coordinates, and signal delay means interposed in series with one only of said signal channels for altering the correlation of noise in the outputs of said signal channels.

References Cited in the file of this patent

UNITED STATES PATENTS

| | | |
|---|---|---|
| 2,426,187 | Earp | Aug. 26, 1947 |
| 2,471,418 | Earp | May 31, 1949 |
| 2,567,197 | Fox | Sept. 11, 1951 |
| 2,580,148 | Wirkler | Dec. 25, 1951 |
| 2,608,683 | Blewett | Aug. 26, 1952 |
| 2,682,656 | Phillips | June 29, 1954 |
| 2,687,520 | Fox et al. | Aug. 24, 1954 |